United States Patent [19]

House

[11] Patent Number: 4,581,088

[45] Date of Patent: Apr. 8, 1986

[54] FINGER JEWELS

[76] Inventor: Robert E. House, 941 Summit Dr., Laguna Beach, Calif. 92651

[21] Appl. No.: 634,170

[22] Filed: Jul. 25, 1984

[51] Int. Cl.[4] .................... B32B 31/00

[52] U.S. Cl. .................... 156/219; 101/27; 101/31; 101/32; 156/233; 156/234; 156/251; 156/268; 428/157; 428/164

[58] Field of Search .................... 156/209, 219, 220, 251, 156/241; 101/27, 31, 32; 156/240, 233, 234, 268, 257; 428/157, 164

[56] References Cited

U.S. PATENT DOCUMENTS

| | | | |
|---|---|---|---|
| 2,749,640 | 6/1956 | Scott | 156/251 X |
| 3,584,572 | 6/1971 | Apicella | 101/31 X |
| 3,629,034 | 12/1971 | Kuroda | 156/219 |

*Primary Examiner*—David Simmons

*Attorney, Agent, or Firm*—Knobbe, Martens, Olson & Bear

[57] ABSTRACT

The present invention relates to decorative imitation set jewels. A process for producing these imitation jewels is also disclosed.

The imitation jewels are formed by causing a narrow margin of metal foil to adhere to the edges of a piece of a plastic film. The film may be cut by a heated die to any desired shape and may be of any color. The foil adhering to the edges of the plastic film gives the product an image of depth which is aesthetically pleasing. The rounding of the plastic film edge caused by the heated die enhances this effect.

An adhesive backing is provided so that the imitation set jewels may be placed where desired. One envisioned utilization of the invention is for ornamenting one's fingernails.

12 Claims, 10 Drawing Figures

Fig. 1
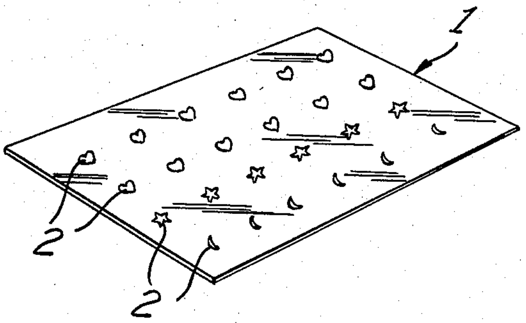
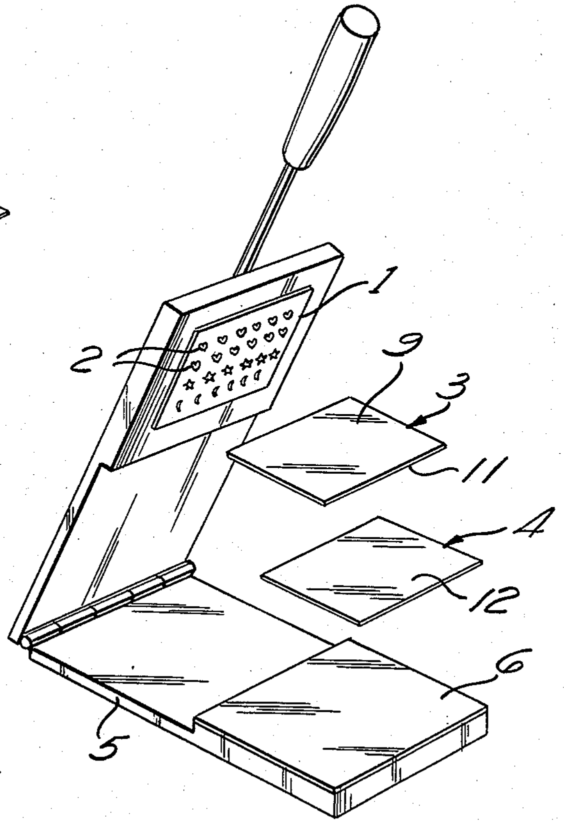
Fig. 2
Fig. 3
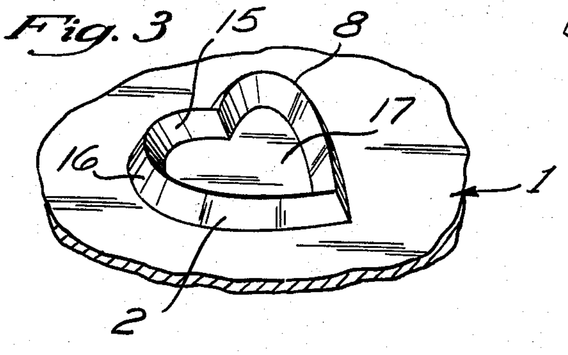
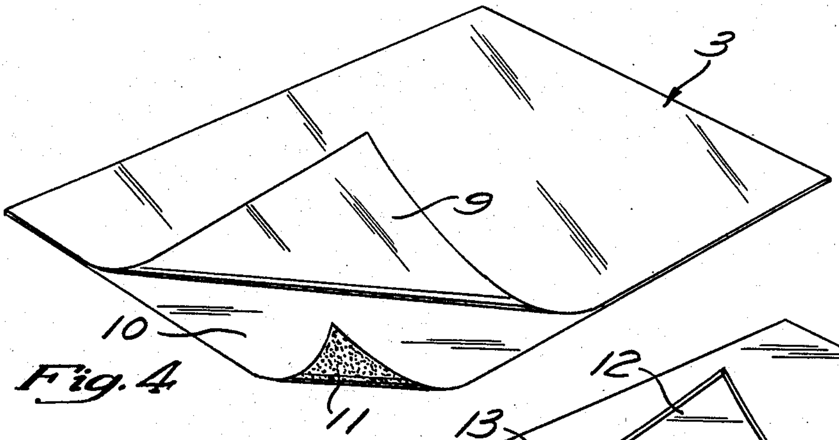
Fig. 4
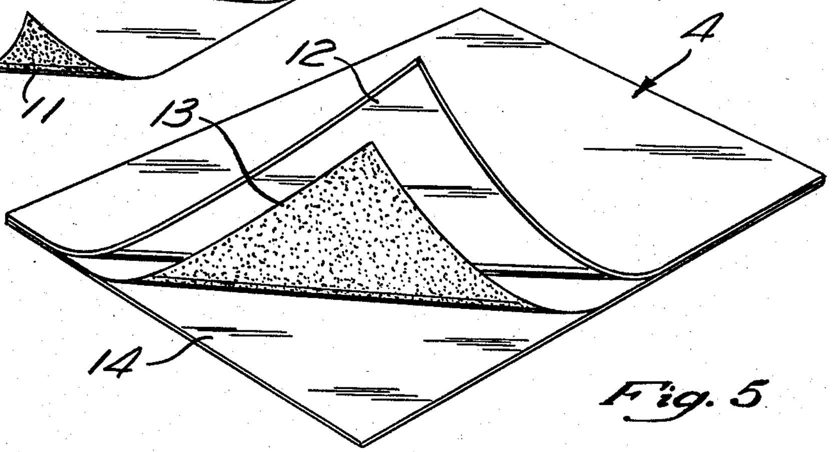
Fig. 5

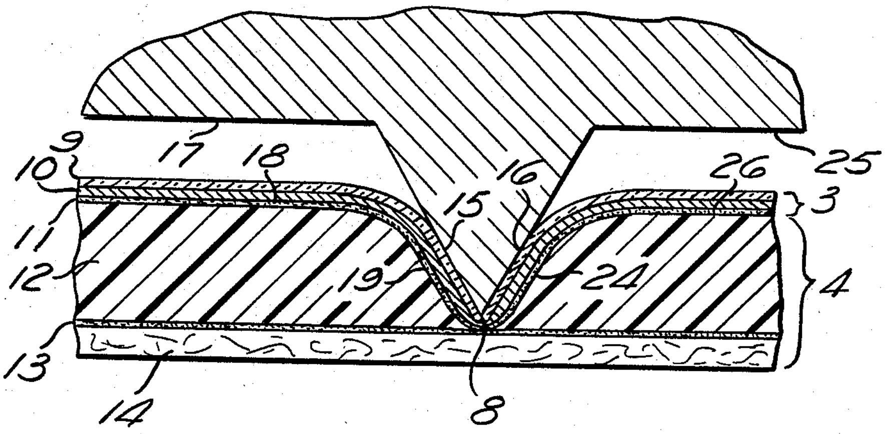
Fig. 6
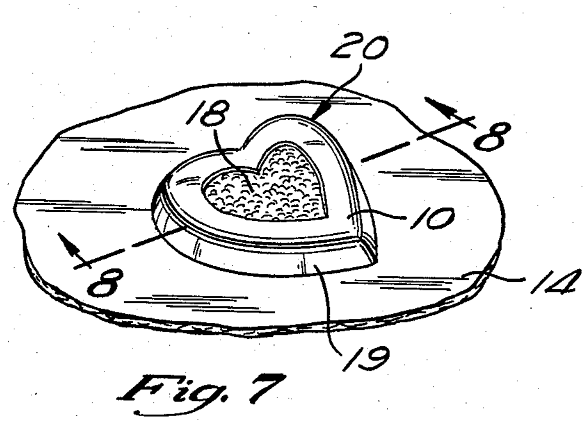
Fig. 7
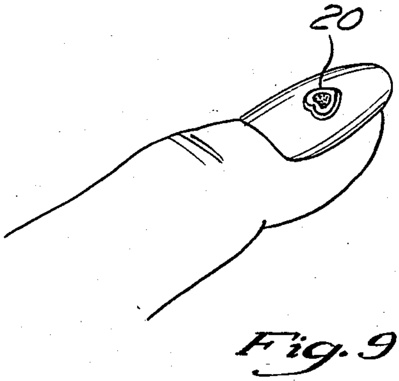
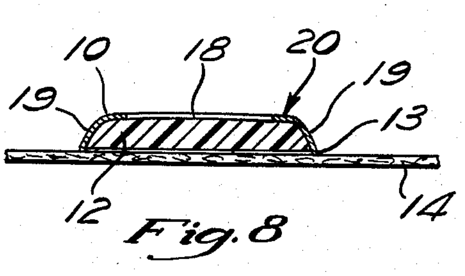
Fig. 8
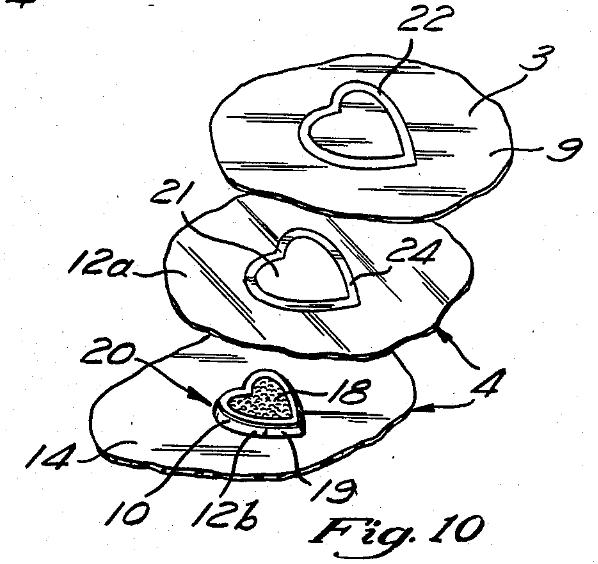
Fig. 10

FINGER JEWELS

BACKGROUND OF THE INVENTION

Prior fingernail art designs have have only a two-dimensional appearance. Furthermore, because of limitations inherent in their design, prior designs do not exhibit a jewelled appearance. A device which provides an appearance of raised edges is desired to provide both an enhanced cosmetic effect and a three-dimensional appearance.

SUMMARY OF THE INVENTION

The present invention relates to both the process for making three-dimensional imitation set jewels and to the three-dimensional imitation set jewels themselves. These imitation set jewels are an attractive decorative item because reflective, metallized edges give the center portion of the product a jewelled appearance as well as giving their edges an attractive impression of depth.

The imitation jewels of the present invention are particularly suitable for use as costume jewelry. For example, a person may wear them upon their fingernails, on other portions of the body, or upon other articles of jewelry, particularly earrings.

A process for manufacturing the imitation set jewels is disclosed that is simple and efficient. A standard heat transfer foil is placed atop a plastic film of the desired color. The heat transfer foil has a layer of mylar, a very thin layer of metal, and a heat sensitive adhesive backing the metal. The plastic film may also have an adhesive backing. This assembly is then placed into a press. When a heated die is impressed upon these materials, the heat applied to the die causes the die to cut the patterns on the die through the plastic film under the heat transfer foil.

The die does not cut through the heat transfer foil because of the foil's flexiblity, and because the mylar backing of the foil will not melt at the temperature of the die. However, the heat from the die causes the portions of the foil which are in contact with the die to adhere to the film beneath the foil. This transfer occurs because the heat from the die activates the heat activated adhesive which forms the backing of the metal foil. The result is that the metal foil adheres to the edges of the plastic film along the borders of the patterns cut in the film by the heat of the die.

The portions of the plastic film which are not a part of the final product, as well as those parts of the foil which did not transfer to the film, are then peeled away. The remaining imitation set jewels will be in the shape of the unpraised portions of the die, each with a reflective, metallized, rounded border.

BRIEF DESCRIPTION OF THE DRAWINGS

FIG. 1 is an illustration of a typical die which can be used with the process of the present invention.

FIG. 2 illustrates the orientation of the various materials used in the process of the present invention within the press.

FIG. 3 is an enlarged view of one of the elements of the die of FIG. 1.

FIG. 4 is a perspective view showing the layers which comprise the metal foil used in the preferred embodiment of the present invention.

FIG. 5 is a perspective view showing the layers which comprise the base material used in the preferred embodiment of the present invention.

FIG. 6 is a drawing showing the orientation of the various materials used in the process of the present invention when the die is impressed upon them.

FIG. 7 is a view of the product which is the subject of the present invention.

FIG. 8 is a cross-section along lines 8—8 of FIG. 7.

FIG. 9 is a drawing of a preferred use of the product of the present invention.

FIG. 10 is a drawing of the materials used in the process of the present invention after they are removed from the press.

DESCRIPTION OF THE PREFERRED EMBODIMENT

FIG. 1 shows a typical die 1 which may be used in the process that is the subject of the present invention. Plural, product-forming elements 2 of the die 1 may be spaced apart, as they are in the preferred embodiment of the invention, or they may be closely packed on the die 1.

The die 1 is positioned in a press 5 as shown in FIG. 2. A sheet of heat transfer foil 3 and a sheet of base material 4 are shown about to be positioned in the press 5. The mylar coating 9 of the heat transfer foil 3 faces the die 1 while the layer of plastic 12 of the base material 4 faces the heat activated adhesive surface 11 of the heat transfer foil 3.

The means for heating the die 1 are not shown in this drawing, but, as is typical in operations of this type, the upper plate of the press 5 includes a heating element which raises the temperature of the die 1, typically to about 500° F. The product-forming elements 2 of the die 1, as shown in FIG. 3, include raised edges 8 which may be either pointed, as shown in FIG. 3, or somewhat flattened. In either case, however, the element 2, which may be of any desired shape, includes a recessed central area 17.

FIG. 4 illustrates the commercially available heat transfer foil 3, also known commercially a "stamping foil", which may be used in the process of the present invention. The foil 3, while not separable in the manner shown in FIG. 4, has been peeled apart at one corner to show its layers 9 and 10. The upper layer 9 is a substance known under the trademark Mylar. The substance 10 is the metal foil which will eventually be transfered to coat the edges of the imitation set jewel. The material 10 may be a metal foil of any color, although gold and silver are preferred. The heat sensitive adhesive 11, which covers the back of the metal foil 10, is also shown.

FIG. 5 is an expanded view of the base material 4 which is used in the present invention. The base material 4 has three layers; 12, 13 and 14. The layer 12 is a thin, i.e., 2–20 mills thick, plastic film. The film 12 may be any desired color, but is preferably reflective, having a jewel-like appearance when used in small areas. The layer 13 is a pressure-sensitive adhesive and, while not separable in the manner shown in FIG. 5, is usually coated on the back of the layer 12. The layer 13 is only weakly attracted to the layer 14, a paper liner. The paper liner 14 is itself coated to limit the extent to which the adhesive 13 will attach itself to the paper liner 14.

The material 4 may be any one of a variety of known products. The material "prismatic vinyl", Stock No. DFV-3-07-½" or a material sold under the brand name of "RAZ-L/DAZ-L", both of which are made by the Universal Coating Company of Minneapolis, Minn. have been found to produce good results. The material 3 may be purchased from Admiral Coated Products, Noonachie, New Jersey under the part numbers ALUM-W718D or GOLD-W127Y.

FIG. 6 is an illustration of the process which is the subject of the present invention. The materials 3 and 4 are shown positioned adjacent to and in contact with each other. The materials 3, 4 are positioned in the press 5 (FIG. 2) and the heated die 1 is shown impressed upon them so that the element 2 (FIG. 3) compresses and heats the materials 3 and 4, allowing the raised edges 8 to become embedded in the materials 3 and 4 as shown in FIG. 6.

The material 3 is positioned so that its Mylar layer 9 is facing the die 1. The heat activated adhesive backing 11 of the metal foil 10 is in contact with the plastic film 12 of the second material 4. The adhesive backing 13 of the plastic film 12, and the paper liner 14 are also shown. It is to be understood that a cushioning material 6 (FIG. 2), such as paper, may be inserted between the press 5 and the paper liner 14, if desired, to increase the area of the die elements 2 which contact the foil layer 3 and the base material 4.

The force on the press 5 (FIG. 2) is such that the raised edges 8 of the die element 2 do not cut the paper liner 14. The edge 8 of the element 2 does, however, melt through the plastic film layer 12 of the material 4. Since the die 1 is heated, the heat activated adhesive 11 will cause the metal foil 10 to adhere to the edges of the plastic film 12 along the portions of the surfaces 15 and 16 of the die element 2 which are in contact with or adjacent to the Mylar coating 9 of the material 3. Since the Mylar layer 9 is tough, and resistant to high temperatures, it is not cut by the element 2. Rather, the Mylar layer 9 conforms to the element 2 and the raised edges 8, pulling the foil 10 and adhesive layer 11 to conform to the rounded cut edges of the plastic film 12. It can therefore be seen that the surfaces 19 and 24 of the plastic film 12 will assume a rounded or beveled configuration conforming to the shape of the edges 8 of the element 2. These rounded edges 19, 24 are provided with a highly reflective, metallic appearance due to the heat transfer properties of the adhesive 11 and the metal foil 10.

In other words, the metal foil 10 will no longer be affixed to the mylar layer 9 of the heat transfer foil 3 along the portions of the Mylar layer 9 which contact or are close to the edges 15 and 16 of the die element 2. Instead, the heat activated adhesive 11 will affix the metal foil 10, in these regions, to the surfaces 19 and 24 of the plastic film 12.

Therfore, those portions of the plastic film 12 which are directly beneath or adjacent the surfaces 15 and 16 of the die element 2 which contact the Mylar layer 9 will assume a metallized appearance. In contrast, the surfaces 18 and 26 of the plastic film 12 which are beneath the surfaces 17 and 25, respectively, of the die 1 and die element 2 will not become coated with the metal foil layer 10. The surfaces 18 and 26 will therefore retain their original color.

Referring to FIG. 10, the manufacturing process is completed by first peeling the material 3 away from the material 4, and then peeling the plastic film 12 from the paper backing 14.

As shown in FIG. 10, after the foil layer 3 has been stamped by the die 1 as shown in FIG. 6 and has been peeled away from the layer 4, a portion of the foil material 10 shown in the general area of numeral 22 of FIG. 10 is stripped from the mylar layer 9 because it is adhered by the temperature sensitive adhesive 11 to the layer 4. Thus the heat transfer foil 3, after it is peeled away from the layer 4, will include areas 22 where the metal foil 10 has been removed from the Mylar layer 9. These areas 22 will correspond to those places where the die element 2 (FIG. 6) heated the foil 3. The removed metal foil 10 forms a shiny metallic coating on the plastic film 12 on both sides of the cutting line where the edge 8 (FIG. 6) has melted through the plastic film 12.

When the plastic film 12 is peeled from the paper backing 14, as shown in FIG. 10, that portion of the plastic layer 12 shown at 12*a* in FIG. 10 will be removed from the backing 14. A portion of the plastic film 12 shown at 12*b* in FIG. 10 will remain attached, however, to the paper backing 14. This separation of the plastic film 12 into two elements 12*a* and 12*b* is caused by peeling the plastic film 12 from the paper backing 14, since peeling forces will only be applied to those portions of the plastic film 12 which are connected. The portion of the plastic film 12*b* was within the perimeter of the element 2 of the die 1 and cut by the edge 8 and so it is no longer connected to the remainder of the plastic film 12*a*. Therefore, peeling the plastic film 12 from the paper backing 14 will leave the portion 12*b* in place on the paper backing 14.

As also shown in FIG. 10, the peeled away plastic film 12*a* includes a void at 21 formed by the die element 2. The margin of this void 21, was cut by the edge 8 (FIG. 6) of the die 1. This margin is bordered by a perimeter 24 of metal foil caused by the edge 16 of the element 2 (FIG. 6) contacting the Mylar layer 9.

The portion 12*b* of the layer 12 which remains attached to the paper backing 14, after the plastic film 12 has been stripped from the paper 14, forms the product 20 of this invention. This product is a cut shape of the plastic film 12*b*, with a marginal edge or perimeter 19 coated with shiny metal foil 10. This metallized edge 19 was deposited by application of heat from the edge 15 (FIG. 6) of the die element 2 to the Mylar layer 9.

The material 3 shown in FIG. 10, the heat transfer foil with the void 22, is discarded, as is the plastic film 12*a*. The elements 20 attached to the paper backing 14 are then sold.

The product which results from the process of the present invention is shown in FIG. 7. It is to be understood that the embodiment shown in FIG. 7 is for the purposes of illustration and does not serve as a limitation upon the shapes which may be assumed. FIG. 7 is an illustration of the product after layer 9, those portions of layers 12 and 13 which were not within the perimeter of the die element 2, and those portions of layers 10 and 11 which were not heated by the dye element 2 have been peeled away. The edge 19 of the imitation set jewel, is beveled, as a consequence of being heat-cut by the die element 2, and this beveled portion is coated with the metal 10 from the heat transfer foil 3. The metal 10 does not cover the upper surface 18 because the surface 17 (FIG. 6) of the die element 2 did not contact or lie close to the mylar layer 9 of the heat transfer foil 3. Therefore, the heat sensitive adhesive 11 did not activate in order to cause metal 10 to adhere to the surface 18 in this region. For this reason, the portions of surface 18 which form the center of the imitation set jewel 20 do not have a metallic appearance, as does the edge 19, but are, instead, the color of the underlying plastic film 12.

FIG. 8 is a cross-sectional view of the imitation set jewel 20 taken along lines 8—8 of FIG. 7. Referring to FIG. 8, one can see that the beveled edge 19 of the imitation set jewel 20 has been coated by the metal 10 from the heat transfer foil 3. This coating 10 acts to accentuate the edge 19 of the jewel 20 as well as to give the jewel 20 an appearance of depth. The fact that the center portion 18 of the surface of the jewel 20 is not coated with the metal 10 creates the appearance of a gem set within a metal perimeter.

FIG. 8 also shows the adhesive layer 13 which binds the jewel 20 to the paper liner 14 so that the jewel 20 may be easily transported during shipping. It is to be understood that the adhesive 13 only weakly adheres the jewel 20 to the liner 14. This allows one to easily pry the jewel 20 from the paper liner 14 when one wishes to use the product of the present invention.

FIG. 9 shows a typical use for the present invention. The product's pleasant appearance makes it quite desirable for use as ornamentation. The use shown in FIG. 9, decorating one's fingernails, has proven to be especially popular.

I claim:

1. The method of creating an imitation set jewel comprising;

positioning a first sheet of heat-transferable, mylar-backed metal foil over a second sheet of paper-backed meltable material, said sheets being placed so that the metal foil surface of said first sheet contacts the meltable material of said second sheet;

placing said first and second sheets in a press which has a die attached to one surface, said die having upraised patterns on the surface facing said sheets, with said materials being positioned so that said mylar backing of said first sheet is facing the surface of the press which has said die attached;

heating said die;

pressing said die onto said first and second sheets, the temperature of the die being sufficient to cause those portions of metal foil which back the portion of said mylar of said first sheet which contacts said die to adhere to said second sheet and also sufficient to melt through said meltable material of said second sheet along an edge of said upraised patterns without severing said mylar of said first sheet or said paper of said second sheet;

releasing the pressure on said die;

removing said first and second sheets from said press;

peeling away said mylar of said first sheet to remove the portions of said metal foil which have not adhered to said second sheet; and peeling away the portions of said meltable material of said second sheet which were not within the perimeter of one of said upraised patterns of said metal die to leave the remaining portions of meltable material attached to said paper of said second sheet.

2. The process for making imitation set jewels, as defined in claim 1, wherein said second sheet additionally comprises an adhesive between said meltable material and said paper backing, said adhesive being more strongly affixed to said upper layer than to said backing, so that said step of peeling away portions of said meltable material also peels away the adhesive of said second sheet which was not within one of said upraised patterns of said die.

3. The process of making imitation set jewels, as set forth in claim 1, wherein a cushioning material is positioned behind said second sheet in said press, said cushioning material increasing the area of said die which contacts said mylar backing of said first sheet.

4. The imitation set jewel which is the product of the process of claim 1.

5. A method of making imitation set jewels comprising:

positioning a sheet of heat-transferable metal foil so that it overlaps a sheet of a second material said second material having a first layer which will melt at a predetermined temperature and a second layer which will not melt at said predetermined temperature;

placing said sheets in a press;

compressing said sheets with a die, said die having upraised patterns with edges on its surfaces, said die being heated to a temperature which will cause said metal foil to transfer to said second material along the edges of said die which contact said metal foil, said die temperature being above said predetermined temperature so that said compressing step melts through said first layer, but not said second layer of said second material along said edges; and peeling away from said second layer of said second material the portions of said first layer of said second material which are not within the perimeter of said upraised patterns.

6. The method of making imitation set jewels, as defined in claim 5, wherein the step of positioning a sheet of heat-transferable metal foil involves positioning a sheet of metal foil which has a coating of mylar on one surface, said foil having the property that the metal of said foil transfers from said mylar coating to a substance placed adjacent to said foil when said foil is pressed between a heated element and said substance, and wherein said compressing step comprises compressing said second material with the heated die so that said upraised patterns melt through said second material but do not sever said mylar coating.

7. The method of making imitation set jewels, as defined in claim 6, wherein said positioning step involves positioning a second material which has an adhesive affixed to said first layer, said adhesive adhering to said second layer less strongly than said adhesive adheres to said first layer, said second material being positioned so that said first layer is adjacent to and in contact with said metal foil.

8. The method of making imitation set jewels, as defined in claim 7, wherein said first layer of said second material comprises a plastic film, and, wherein said second layer of said second material comprises paper.

9. The method of making imitation set jewels, as defined in claim 5, additionally comprising placing a cushioning material on said press to increase the area of said die which contacts said sheet of heat-transferable metal foil.

10. The imitation set jewel which is produced by the method of claim 5.

11. A method of making imitation set jewels comprising:

positioning a first sheet of metal foil which has a mylar coating on one surface and a first adhesive affixed to the other surface so that said first sheet is adjacent to and in contact with a second sheet of material which has distinct first and second layers, said first sheet being positioned so that said first adhesive contacts said first layer of said second sheet;

placing said first and second sheets within a press which has a die attached to one surface, said die having upraised patterns on one surface, said sheets being oriented so that the mylar coating on said first sheet faces the surface of the press which has the die attached;

pressing said first and second sheets to cause said upraised patterns to penetrate said first layer of said second sheet without severing said mylar coating or said second layer, and to activate said first adhesive so that said first adhesive adheres the portions of said metal foil which the die contacted to said second sheet;

peeling away from said second layer of said second sheet the portions of said first layer of said second sheet which are outside of said patterns which penetrated said second sheet and the portions of said first sheet which are not adhered to said first layer of said second sheet.

12. The process of claim 11 wherein said first layer of said second sheet of material comprises a thin layer of plastic and a second adhesive affixed to said thin layer of plastic and wherein said second layer of said second sheet comprises material to which said second adhesive adheres less strongly than said second adhesive adheres to said plastic layer, said second sheet of material being positioned so that said plastic layer is adjacent to and in contact with said first adhesive and wherein the pressure on said die during said pressing step is sufficient to penetrate said plastic and said second adhesive but not said second layer of said second sheet.

* * * * *